US010022672B2

(12) United States Patent
Schoenhaber et al.

(10) Patent No.: US 10,022,672 B2
(45) Date of Patent: Jul. 17, 2018

(54) CATALYST SYSTEM FOR GASOLINE COMBUSTION ENGINES, HAVING THREE-WAY CATALYSTS AND SCR CATALYST

(71) Applicant: UMICORE AG & CO. KG, Hanau-Wolfgang (DE)

(72) Inventors: Jan Schoenhaber, Darmstadt (DE); Marcus Schmidt, Ginsheim (DE); Frank Adam, Linsengericht (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/124,481

(22) PCT Filed: Mar. 11, 2015

(86) PCT No.: PCT/EP2015/055061
§ 371 (c)(1),
(2) Date: Sep. 8, 2016

(87) PCT Pub. No.: WO2015/135983
PCT Pub. Date: Sep. 17, 2015

(65) Prior Publication Data
US 2017/0014766 A1 Jan. 19, 2017

(30) Foreign Application Priority Data
Mar. 13, 2014 (DE) .................. 10 2014 204 682

(51) Int. Cl.
*B01D 53/94* (2006.01)
*F01N 3/08* (2006.01)
(Continued)

(52) U.S. Cl.
CPC ....... *B01D 53/9477* (2013.01); *B01D 53/945* (2013.01); *B01D 53/9431* (2013.01);
(Continued)

(58) Field of Classification Search
CPC ......... Y02T 10/22; B01J 23/464; B01J 23/63; B01J 35/0006; B01J 37/0246;
(Continued)

(56) References Cited

U.S. PATENT DOCUMENTS 5,001,103 A  3/1991 Koberstein et al.
5,013,705 A  5/1991 Koberstein et al.
(Continued)

FOREIGN PATENT DOCUMENTS

DE  4128823 A1  3/1993
DE  19941051 A1  3/2001
(Continued)

OTHER PUBLICATIONS

Zhao et al. "Effect of surface area and bulk structure on oxygen storage capacity of Ce0.67Zr0.3O2" Journal of Catalysis 248 ( 2007) 258-267.*
(Continued)

*Primary Examiner* — Colleen P Dunn
*Assistant Examiner* — Syed T Iqbal
(74) *Attorney, Agent, or Firm* — Smith, Gambrell & Russell, LLP

(57) ABSTRACT

The present invention is directed to a catalyst system for the reduction of the harmful exhaust-gas constituents hydrocarbons (THC), carbon monoxide (CO), nitrogen oxides ($NO_x$), and the environmentally detrimental secondary emissions ammonia ($NH_3$) and nitrous oxide ($N_2O$) of combustion engines operated using gasoline and to a corresponding method for exhaust-gas purification. The system is characterized by a particular arrangement of catalysts and is used in the case of engines which are operated with predominantly, on average, stoichiometric air/fuel mixtures. Here, a three-way catalyst produced in accordance with the current prior art is preferably installed in a close-coupled position.
(Continued)

In the underfloor position, there is situated an SCR catalyst produced in accordance with the current prior art, followed by a further three-way catalyst produced in accordance with the current prior art. The three-way catalyst in the underfloor region furthermore has a lower oxygen-storing capacity than the close-coupled three-way catalyst.

14 Claims, 6 Drawing Sheets

(51) Int. Cl.
- F01N 3/10 (2006.01)
- B01J 23/46 (2006.01)
- B01J 23/44 (2006.01)
- F01N 3/20 (2006.01)
- F01N 13/00 (2010.01)

(52) U.S. Cl.
CPC .......... *B01D 53/9445* (2013.01); *B01J 23/44* (2013.01); *B01J 23/464* (2013.01); *F01N 3/0814* (2013.01); *F01N 3/101* (2013.01); *F01N 3/2066* (2013.01); *F01N 13/009* (2014.06); *B01D 53/9409* (2013.01); *B01D 2251/206* (2013.01); *B01D 2255/1023* (2013.01); *B01D 2255/1025* (2013.01); *B01D 2255/2092* (2013.01); *B01D 2255/50* (2013.01); *B01D 2255/904* (2013.01); *B01D 2255/908* (2013.01); *B01D 2255/9022* (2013.01); *B01D 2255/911* (2013.01); *B01D 2257/402* (2013.01); *B01D 2257/406* (2013.01); *B01D 2258/014* (2013.01); *Y02C 20/10* (2013.01); *Y02T 10/22* (2013.01); *Y02T 10/24* (2013.01)

(58) Field of Classification Search
CPC .................. B01J 37/0244; B01J 23/42; B01D 2255/1023; B01D 2255/9022; B01D 53/9472; B01D 2258/014; B01D 53/945; B01D 2255/1025; B01D 53/9477; B01D 2255/908
See application file for complete search history.

(56) References Cited

U.S. PATENT DOCUMENTS

| | | |
|---|---|---|
| 5,335,538 A | 8/1994 | Blischke et al. |
| 5,672,557 A | 9/1997 | Williamson et al. |
| 6,387,338 B1 | 5/2002 | Anatoly et al. |
| 6,468,941 B1 | 10/2002 | Bortun et al. |
| 6,601,381 B2 | 8/2003 | Mussman et al. |
| 6,605,264 B2 | 8/2003 | Bortun et al. |
| 6,655,129 B2 | 12/2003 | Lindner et al. |
| 6,767,442 B1 | 7/2004 | Scheer et al. |
| 6,875,725 B2 | 4/2005 | Lindner et al. |
| 7,041,622 B2 | 5/2006 | Nunan |
| 8,066,963 B2 | 11/2011 | Klingmann et al. |
| 8,226,896 B2 | 7/2012 | Pfeiffer et al. |
| 8,291,695 B2 | 10/2012 | Perry et al. |
| 8,323,599 B2 | 12/2012 | Nunan et al. |
| 8,393,140 B2 | 3/2013 | Perry et al. |
| 8,394,348 B1 | 3/2013 | Nunan et al. |
| 8,491,847 B2 | 7/2013 | Kato et al. |
| 8,522,536 B2 | 9/2013 | Zhan et al. |
| 8,640,440 B2 | 2/2014 | Klingmann et al. |
| 8,661,788 B2 | 3/2014 | Qi et al. |
| 8,663,588 B2 | 3/2014 | Lindner et al. |
| 9,156,023 B2 | 10/2015 | Klingmann et al. |
| 9,278,336 B2 | 3/2016 | Choi et al. |
| 2005/0252771 A1 | 11/2005 | Wiedenmann et al. |
| 2006/0010857 A1 | 1/2006 | Hu et al. |
| 2009/0260349 A1 | 10/2009 | Gandhi et al. |
| 2010/0043402 A1 | 2/2010 | Perry et al. |
| 2010/0135879 A1 | 6/2010 | Roesch et al. |
| 2010/0233051 A1 | 9/2010 | Grisstede et al. |
| 2010/0287915 A1 | 11/2010 | Zhan et al. |
| 2010/0293929 A1 | 11/2010 | Zhan et al. |
| 2011/0158871 A1 | 6/2011 | Arnold et al. |
| 2011/0202253 A1 | 8/2011 | Perry et al. |
| 2011/0252773 A1 | 10/2011 | Arnold et al. |
| 2012/0128558 A1* | 5/2012 | Nunan ................ B01D 53/945 423/213.5 |
| 2012/0247088 A1 | 10/2012 | Beall et al. |
| 2013/0047583 A1 | 2/2013 | Driscoll et al. |
| 2014/0039781 A1* | 2/2014 | Theis .................... F01N 13/011 701/112 |

FOREIGN PATENT DOCUMENTS

| | | |
|---|---|---|
| DE | 10216724 C1 | 10/2003 |
| DE | 102012015840 A1 | 11/2009 |
| DE | 102008002734 A1 | 12/2009 |
| DE | 102009056390 A1 | 8/2010 |
| DE | 102009054046 A1 | 9/2010 |
| DE | 102010055147 A1 | 6/2012 |
| DE | 102011121848 A1 | 4/2013 |
| DE | 102012105822 A1 | 5/2013 |
| EP | 0314057 A1 | 5/1989 |
| EP | 0314058 A1 | 5/1989 |
| EP | 0324082 A1 | 7/1989 |
| EP | 0582971 A1 | 2/1994 |
| EP | 0601314 A1 | 6/1994 |
| EP | 0662862 B1 | 5/1998 |
| EP | 0870531 A1 | 10/1998 |
| EP | 0915244 A2 | 5/1999 |
| EP | 1158146 A2 | 11/2001 |
| EP | 1181970 A1 | 2/2002 |
| EP | 1184555 A2 | 3/2002 |
| EP | 1227231 A2 | 7/2002 |
| EP | 1911506 A1 | 4/2008 |
| EP | 1961933 A1 | 8/2008 |
| EP | 1974809 A1 | 10/2008 |
| EP | 2042225 A1 | 4/2009 |
| EP | 2042226 A2 | 4/2009 |
| EP | 2308592 A1 | 4/2011 |
| EP | 2650042 A1 | 10/2013 |
| EP | 2117707 B1 | 4/2015 |
| WO | 2004/076829 A1 | 9/2004 |
| WO | 2005113126 A1 | 1/2005 |
| WO | 2008/000449 A2 | 1/2008 |
| WO | 2008/106518 A2 | 9/2008 |
| WO | 2008/113445 A1 | 9/2008 |
| WO | 2008/113457 A1 | 9/2008 |
| WO | 2012/175409 A1 | 12/2012 |
| WO | 2013/014467 A1 | 1/2013 |
| WO | WO2013092707 A1 | 6/2013 |

OTHER PUBLICATIONS

International Search Report for PCT/EP2015/055061, dated May 26, 2015 in English and German Language.

Hagelüken. Autoabgaskatalysatoren, Grundlagen—Herstellung—Entwicklung—Recycling—Ökologie [Exhaust Gas Catalysts for Vehicles, Foundations—Manufacture—Development—Recycling—Ecology], 2nd Edition, 2005, p. 27-46, 49, 62.

Heck et al., Automotive Catalyst. Catalytic Air Pollution Control: Commercial Technology, 1995, pp. 73-112.

Federal Register; vol. 75, No. 88, 2010 / Rules and Regulations, p. 25399.

Federal Register; vol. 77, No. 199, 2012 / Rules and Regulations, p. 62799.

Ball et al. Cold Start Calibration of Current PZEV Vehicles and the Impact of LEV-III Emission Regulations, 2012, SAE International 2012-01-1245, p. 1-12.

Hausberger. N2O aus mobile Quellen. ACCC-Workshop N2O und das Kyoto-Ziel [N2O and the Kyoto-Target] p. 1-14.

(56) References Cited

OTHER PUBLICATIONS

Koike et al. Reduction of $N_2O$ from Automobiles Equipped with Three-Way Catalyst-Analysis of $N_2O$ Increase Due to Catalyst Deactivation. 1999, SAE Technical Paper Series 1999-01-1081, p. 1-8.
Odaka et al. Deterioration Effect of Three-way Catalyst on Nitrous Oxide Emission. 1998, Technical Paper Series 980676. p. 1-8.
Gifhorn et al. Einfluß abgasspezifischer Parameter auf die $N_2O$-Bildung am Pd/Rh-Katalysator [Influence of Exhaust Gas-Specific Parameters on $N_2O$ Formation in a Pd/Rh Catalyst], MTZ Motortechnische Zeitschrift 59 (1998) 6. p. 378-383.
Guralp et al. Experimental Study of NOx Reduction by Passive Ammonia-SCR for Stoichiometric SIDI Engines. 2011. SAE International 2011-0307 p. 1-10.
Rohart et al. From Zr-rich to Ce-rich: thermal stability of OSC materials on the whole range of composition. Macaudiére, Top. Catal. 2004, 30/31, p. 417-423.
Di Monte et al. On the role of oxygen storage in three-way catalysis. Topics in Catalysis. 2004, vol. 28, Nos. 1-4 p. 47-57.
Twigg. Catalytic control of emissions from cars. Catalysis Today 2011, 163, p. 33-41.
Written Opinion of the International Searching Authority for International Application No. PCT/EP2015/055061 dated Sep. 17, 2015 (12 pages).
International Preliminary Report on Patentability for International Application No. PCT/EP2015/055061 dated Sep. 13, 2016 (14 pages).

* cited by examiner

CATALYST SYSTEM FOR GASOLINE COMBUSTION ENGINES, HAVING THREE-WAY CATALYSTS AND SCR CATALYST

The present invention relates to a catalyst system for reducing harmful exhaust gas components of gasoline-powered combustion engines and to a corresponding method for exhaust gas purification. The system is characterized by a particular arrangement of catalysts and is used with engines which are operated with predominantly, on average, stoichiometric air/fuel mixtures.

The exhaust gas of combustion engines in motor vehicles typically contains the harmful gases carbon monoxide (CO) and hydrocarbons (HC), nitrogen oxides ($NO_x$) and possibly sulfur oxides ($SO_x$), as well as particulates that mostly consist of soot residues and possibly adherent organic agglomerates. CO, HC, and particulates are the products of the incomplete combustion of the fuel inside the combustion chamber of the engine. Nitrogen oxides form in the cylinder from nitrogen and oxygen in the intake air when the combustion temperatures locally exceed 1400° C. Sulfur oxides result from the combustion of organic sulfur compounds, small amounts of which are always present in non-synthetic fuels. For the removal of these emissions that are harmful to health and environment from the exhaust gases of motor vehicles, a variety of catalytic technologies for the purification of exhaust gases have been developed, the fundamental principle of which is usually based upon guiding the exhaust gas that needs purification over a catalyst consisting of a flow-through or wall-flow honeycomb-like body and a catalytically active coating applied to it. This catalyst facilitates the chemical reaction of different exhaust gas components, while forming non-hazardous products like carbon dioxide and water. The mode of operation and the composition of the catalysts that are used differ significantly depending upon the composition of the exhaust gas to be purified and the exhaust gas temperature level that is to be expected at the catalyst. A variety of compositions used as catalytically active coatings contain components, in which, under certain operating conditions, one or more exhaust gas components can be temporarily bound and, when an appropriate change in operating conditions occurs, be intentionally released again. Components with such a capacity are generally referred to below as storage materials.

For example, oxygen-storing materials in three-way catalysts are used to remove CO, HC, and $NO_x$ from the exhaust gas of gasoline engines that are operated with predominantly, on average, stoichiometric air/fuel mixtures. The best-known materials for storing oxygen are mixed oxides of cerium and zirconium that may be doped with further oxides, especially with rare earth metal oxides such as lanthanum oxide, praseodymium oxide, neodymium oxide or yttrium oxide (Autoabgaskatalysatoren, Grundlagen-Herstellung-Entwicklung-Recycling-Ökologie [Exhaust Gas Catalysts for Vehicles, Foundations-Manufacture-Development-Recycling-Ecology], Christian Hagelüken, 2nd Edition, 2005, p. 49; Catalytic Air Pollution Control, Commercial Technology, R. Heck et al., 1995, pp. 73-112).

The expression "predominantly on average" takes into consideration the fact that modern gasoline engines are not statically operated with a fixed air/fuel ratio. Three-way catalysts that contain oxygen-storing material are operated in such gasoline engines under conditions involving a discontinuous progression of the air/fuel ratio $\lambda$. They involve a periodic change of the air/fuel ratio $\lambda$ in a defined manner and thus, a periodic change of oxidizing and reducing exhaust gas conditions. This change in the air/fuel ratio $\lambda$ is in both cases key for the result of the purification of exhaust gas. To this end, the $\lambda$ value of the exhaust gas is regulated with a very short cycle time (ca. 0.5 to 5 Hertz) and an amplitude $\Delta\lambda$ of $0.005 \leq \Delta\lambda \leq 0.07$ at the value $\lambda=1$ (reducing and oxidizing exhaust gas components are present in a stoichiometric relationship to each other). Therefore, on average, the exhaust gas under such operating conditions should be described as "on average" stoichiometric. In order for these deviations not to have a negative effect on the purification results of exhaust gas when the exhaust gas flows over the three-way catalyst, the oxygen-storing materials contained in the catalyst balance out these deviations to a certain degree by absorbing oxygen from the exhaust gas and releasing it into the exhaust gas as needed (Catalytic Air Pollution Control, Commercial Technology, R. Heck et al., 1995, p. 90). However, due to the dynamic engine operation in the vehicle, further deviations from this condition also occur intermittently. For example, under extreme acceleration or during braking while coasting, the operating conditions of the engine and consequently of the exhaust gas can be adjusted and can, on average, be hypo-stoichiometric or hyper-stoichiometric. However, the gasoline engines described here demonstrate an exhaust gas which is predominantly—i.e., for the majority of the time of the combustion operation—operated with an air/fuel mixture that is, on average, stoichiometric.

The continually growing demands for the reduction of emissions by combustion engines require a continuous further development of catalysts. In addition to the start-up temperature of the catalytic converter, its temperature stability and, of course, the extent to which the main exhaust gas components of a gasoline engine—hydrocarbons, carbon monoxide, and nitrogen oxides—are reduced are of particular importance for the conversion of the harmful substances.

As well as reducing these primary emissions, more recent legislation governing waste gas emissions in the U.S. (GHG Emission Standard) does not just enforce the drastic reduction of primary emissions described above, but also requires maximum suppression of the emissions from secondary emissions, such as methane ($CH_4$) and the potent greenhouse gas nitrous oxide ($N_2O$) (Federal Register; Vol. 75, No. 88, 2010/Rules and Regulations, Page 25399; Federal Register; Vol. 77, No. 199, 2012/Rules and Regulations, Page 62799; http://epa.gov/climatechange/ghgemissions/gases/n2o.html). These types of guidelines for the output of secondary emissions $NH_3$, $CH_4$, and $N_2O$ are also currently under discussion in the European Union and will potentially be integrated in EU6, which comes into force in 2014, but will certainly be included in subsequent legislation.

Modern systems for preventing harmful exhaust gases for stoichiometrically operated combustion engines often work with at least two three-way catalysts, with one being positioned close to the engine for faster heating and the other being located in the colder underfloor region (Ball, D., Moser, D., SAE Technical Paper 2012-01-1245, 2012). This type of arrangement allows a wider temperature range to be covered by the activity windows of the three-way catalysts.

However, the direct injection of the fuel into the combustion chamber of gasoline engines and the turbo charger arranged in its turn downstream of the outlet valve result in a constant cooling of the exhaust gas temperature. These low temperatures are no longer sufficient for operating the underfloor catalyst with adequate conversion efficiency, especially in city driving and long-distance trips. By contrast, it is known that the formation of $N_2O$ in a three-way catalyst is particularly intensive with stoichiometrically operated combustion engines in a specific temperature range and with specific λ values (Hausberger, ACCC-Workshop "N₂O and das Kyoto-Ziel" ["$N_2O$ and the Kyoto-Target"], http://www.accc.gv.at/pdf/no-hausberger.pdf; Koike, N., Odaka, M., Suzuki, H., SAE Technical Paper 1999-01-1081, 1999; Odaka, M., Koike, N., Suzuki, H., SAE Technical Paper 980676, 1998; Gifhorn et al., Einfluss abgasspezifischer Parameter auf die N₂O-Bildung am Pd/Rh-Katalysator [Influence of Exhaust Gas-Specific Parameters on $N_2O$ Formation in a Pd/Rh Catalyst], MTZ Motortechnische Zeitschrift 59 (1998) 6). Consequently, the cooler exhaust gas temperature causes an increased formation of the greenhouse gas $N_2O$, since the bed temperature of the underfloor catalyst often moves permanently in the optimal nitrous gas formation window of 250-350° C.

It is known that three-way catalysts produce $NH_3$ when they are acted upon by a rich exhaust gas mixture (SAE 2011010307). As a result, investigations were carried out in which, by means of a system comprising a three-way catalyst (TWC) located close to the engine (cc) and an SCR catalyst, capable of storing $NH_3$ located in the underfloor (uf), the exhaust gas situation can be further improved, even with combustion engines which are operated predominantly, on average, stoichiometrically, especially since, in this case, as indicated above, it works alternately in the light rich to light lean air/fuel range and, therefore, $NH_3$ production and NOx slippage alternate (SAE 2011010307, DE102009056390A1, US20120247088A1, U.S. Pat. No. 8,522,536B2).

Exhaust gas systems which take further the concept of a three-way catalyst close to the engine and an SCR catalyst located downstream are described in DE102009054046A1. Among other things, a system is proposed in which a cc-TWC is followed by a uf-SCR and a further uf-TWC positioned downstream thereof. The uf-TWC arranged on the exhaust gas outlet side of the uf-SCR obviously has, according to this disclosure, the same design as the cc-TWC close to the engine. It is used, apparently without exception, to oxidize $NH_3$ which breaks through the uf-SCR catalyst.

The DE102011121848A1 is also aimed at an exhaust gas system consisting of a three-way catalyst followed by an ammonia SCR catalyst. The ammonia SCR catalyst has (1st) a base-metal-ion-substituted zeolite and/or a base-metal-ion-substituted silicon aluminum phosphate and (2nd) an oxygen-storing material which is selected from the group comprising a metal oxide or a mixed metal oxide that has an oxygen storage and release capacity. The arrangement in series of the TWC and the ammonia SCR catalyst increases the conversion of NOx to $N_2$ in the exhaust gas flow with low oxygen content generated by the engine. The disclosure of this specification makes mention of the fact that the downstream ammonia SCR catalyst can fundamentally replace all or part of a second three-way catalyst in a system with two three-way catalysts. As already indicated, the ammonia SCR catalyst has an oxygen-storing material.

The present invention has, in contrast to the prior art, the aim of specifying an improved exhaust gas system which, along with reducing the primary harmful gases, also aims to prevent secondary emissions, in particular $NH_3$ and $N_2O$, to the greatest extent possible. This and other aims evident from the closest prior art to the person skilled in the art are solved by a system having the identifying characteristics of the present claim 1. Preferred embodiments of the system referred to are found in the sub-claims that are dependent on claim 1. A method for purifying exhaust gases from gasoline engines which are operated with predominantly, on average, stoichiometric air/fuel mixtures in accordance with claim 8 is also a subject matter of this invention.

By providing a catalyst system for reducing harmful exhaust gases from vehicles which are operated predominantly, on average, stoichiometrically, comprising units in the following sequence in the exhaust gas tract:

i) a three-way catalyst arranged close to the engine, ii) an SCR catalyst arranged in the underfloor of the vehicle, having an $NH_3$-storing capacity, and iii) an additional three-way catalyst arranged downstream of the SCR catalyst, wherein the additional three-way catalyst arranged downstream of the SCR catalyst has less oxygen-storing capacity (in mg/L Cat) than the three-way catalyst arranged close to the engine, one can very easily, but no less advantageously, arrive at the solution to the aim set. By selecting a system layout as portrayed above for reducing harmful gases and furnishing the downstream three-way catalyst with a lower oxygen-storing capacity content than the three-way catalyst arranged close to the engine, an improved reduction of the primary exhaust gas components HC, CO, and NOx is, on the one hand, able to be achieved (FIG. 9). Surprisingly, however, this type of system also produces a drastically improved result in relation to the output of the secondary emissions, nitrous oxide ($N_2O$) and ammonia ($NH_3$) (FIG. 3-FIG. 6).

Accordingly, the present catalyst system comprises at least three different units: a three-way catalyst close to the engine, an ammonia-storing SCR catalyst located in the underfloor, and an additional three-way catalyst located downstream thereof (FIG. 1). It should be remembered that the three-way catalyst arranged close to the engine is distinguished from the three-way catalyst located downstream of the SCR catalyst, at least with respect to the oxygen-storing capacity. According to the invention, oxygen-storing capacity refers to the capacity to absorb oxygen from oxygen-rich, ambient exhaust gas into the crystal lattice of the oxygen-storing material and to release it to the ambient exhaust gas when there is an excess of reducing compounds. According to the invention, the oxygen-storing capacity is expressed by the amount of oxygen absorbed per gram/molar weight of catalytically active coating or catalyst volume (i.e., mg/L Cat). Accordingly, the proportion of a catalyst's oxygen-storing capacity can be adjusted by the use of more or less of a material which is capable of storing oxygen. On the other hand, it is also possible to use various materials which are distinguished by their oxygen-storing capacity (measured in μg of stored $O_2$/mmol of storage component). The person skilled in the art knows how this can be achieved. In a fresh state, it is preferred that the three-way catalyst close to the engine makes up >50%—preferably ≥60%, and most particularly preferably ≥70%—of the total oxygen-storing capacity (in mg/L Cat) of the catalyst system according to the invention.

Thus, oxygen-storing materials have redox properties and can react with oxidizing components, such as oxygen or nitrogen oxides, in oxidizing atmosphere, or with reducing components, such as hydrogen or carbon monoxide, in reducing atmosphere. Examples of oxygen-storing materials include cerium and praseodymium or appropriate mixed oxides, which can additionally contain the following components selected from the group of zirconium, neodymium, yttrium, and lanthanum. These oxygen-storing materials are often doped with noble metals, such as Pd, Rh, and/or Pt, whereby the storing capacity and storing characteristics can be modified.

EP1911506 describes the realization of the exhaust gas after-treatment of a combustion engine working mainly in the lean range. In this case, a particle filter provided with an oxygen-storing material is used. Advantageously, according to the invention, an oxygen-storing material of this type consists of a cerium/zirconium mixed oxide. Other oxides of, in particular, rare earth metals can be present. Thus, preferred embodiments of the oxygen-storing material according to the invention additionally contain lanthanum oxide or neodymium oxide. Cerium oxide, which can be present as $Ce_2O_3$ as well as $CeO_2$, is used most frequently. Additional useful storage materials are described in, for example, WO05113126A, U.S. Pat. No. 6,387,338, U.S. Pat. No. 7,041,622, EP2042225A, and EP1227231A, as well as in B.: E: Rohart, O. Larcher, S. Deutsch, C. Hédouin, H. Aimin, F. Fajardie, M. Allain, P. Macaudière, *Top. Catal.* 2004, 30/31, 417-423 or R. Di Monte, J. Kaspar, *Top. Catal.* 2004, 28, 47-57. In this regard, reference is also made to the disclosure of U.S. Pat. No. 6,605,264 and U.S. Pat. No. 6,468,941.

These types of oxygen-storing materials are also preferably used in the three-way catalysts according to the invention. As already indicated, the oxygen-storing material is able to remove oxygen from the exhaust gas in the lean range and to release it again under rich exhaust gas conditions. This prevents the NOx conversion over the TWC from lessening and NOx breaches from occurring during a short-term deviation of the fuel-air ratio from $\lambda=1$ into the lean range. Furthermore, a filled oxygen storage prevents HC and CO breaches when the exhaust gas temporarily passes into the rich range, since, under rich exhaust gas conditions, the stored oxygen reacts first with the excess HC and CO before a breach occurs. In this case, the oxygen storage is used as a buffer against fluctuations around $\lambda=1$. A half-filled oxygen storage provides the best performance in terms of being able to absorb short-term deviations from $\lambda=1$. In order to be able to determine the fill level of the oxygen storage during operation, A sensors (DE19941051 A1; DE102008002734 A1; DE10216724 C1) are used, wherein, under real driving conditions, a distinction is made only between the two extreme states of full and empty oxygen storage. The oxygen-storing capacity correlates with the age condition of the entire three-way catalyst. Within the context of the OBD (On Board Diagnosis), the determination of the storage capacity serves to identify the current activity and, therefore, the aging condition of the catalyst.

The three-way catalysts used are sufficiently known to the person skilled in the art. It should be noted that the three-way catalysts used here may consist either of one supporting body or of multiple individual three-way catalysts arranged adjacent to each other in the flow direction. According to the invention, adjacent means an arrangement in which the supporting bodies constituting the three-way catalyst are arranged to abut or be at a certain distance from one another. This applies to both the three-way catalyst close to the engine and the three-way catalyst located in the underfloor, wherein it is extremely preferred that no additional catalytic unit except the SCR catalyst is present between the cc-TWC and the uf-TWC. Preferred, however, is an arrangement in which the supporting bodies constituting the respective three-way catalysts (cc, uf) are positioned in a connected manner, and thus arranged directly one after the other (abutting).

The individual supporting body is prepared in such a way that the respective catalytic coating is present on or inside the support or the supporting bodies (see EP1974809A or EP2308592A for coating on the wall and EP2042226A2 for coating inside the wall). In the present case, the three-way catalyst close to the engine preferably comprises two supporting bodies which are arranged directly one after the other (abutting) in a housing. However, the reduction in gaseous pollutants described here can also be achieved by a single three-way catalyst close to the engine, said catalyst being coated homogeneously or in zones. In contrast, the catalyst unit arranged in the underfloor advantageously comprises a supporting body with the SCR coating and a subsequent supporting body with the three-way coating. The latter are also arranged advantageously directly one after the other (abutting) in a housing. Such a system is rendered schematically in, for example, FIG. 5.

The catalytically active coating, which is used in the TWC close to the engine (cc-) or the uf-TWC in this case, recruits materials that are well known for this purpose to the person skilled in the art (M. V. Twigg, *Catalysis Today* 2011, 163, 33-41; EP1158146A2; EP0870531A1; EP0601314A1; EP0662862A1; EP0582971A1; EP0314058A1; EP0314057A1). Often, the catalytic coating of three-way catalysts contains the metals platinum, palladium, and rhodium in differing compositions, deposited on metal oxides with a large surface area that are relatively temperature-resistant, e.g., aluminum oxide or cerium-zirconium oxide. According to the invention, the catalytic coating can possibly be zoned in differing compositions and/or be present in one or more possibly differently designed catalytic coatings one above the other on the supporting body/bodies (WO08113445A1, WO08000449A2; WO08113457A1; U.S. Pat. No. 8,323,599B2). In addition, commonly known three-way coatings often have further features, such as hydrocarbon storage or nitrogen oxide storage (four-way catalyst). However, the present three-way catalysts, which may also possess said functions, have a material that stores the oxygen in the automotive exhaust gas, said material being able, as described at the beginning, to store oxygen in the lean range ($\lambda>1$) and to release it to the surrounding medium in the rich range ($\lambda<1$) and being, according to the invention, distributed over the three-way catalysts in such a way that there is less oxygen-storing capacity present in the three-way catalyst located on the downstream side of the SCR catalyst than on the TWC close to the engine. The presence or absence of oxygen-storing capacity can be determined by means of the leap test. To this end, the oxygen-storing capacity in mg/L Cat of a catalyst or system positioned between two $\lambda$ sensors is calculated by means of the time delay of the two sensor signals occurring during air/fuel ratio leaps (e.g., between lambda 0.95-1.05) (Autoabgaskatalysatoren, Grundlagen-Herstellung-Entwicklung-Recycling-Ökologie, Christian Hagelüken, 2nd Edition, 2005, p. 62). Typically, the oxygen-storing capacity is measured at exhaust gas temperature in the range of 400-650° C. in front of the catalyst inlet and with exhaust gas flow rates of 30-100 kg/h. The appropriate evaluation of the signals from both sensors is described in detail in DE4128823A1.

The three-way catalysts according to the invention (cc-TWC and uf-TWC) are used advantageously in the form that at least 1—but preferably 2 or more—different catalytically active coatings are arranged on top of each other in at least 1 or 2, or more areas in the catalysts. For at least 2 areas, the coatings are either located on one supporting body in at least 2 separate zones, or are distributed on at least 2 individual supporting bodies positioned one after the other (e.g., FIG. 5). If there are several zones/supporting bodies, they can advantageously exhibit a construction with at least 1 layer or with 2 layers. The appropriate layer structures also apply to three-way catalysts with 1 area/zone. In a preferred embodiment, the cc-TWC according to the invention comprises a homogeneously coated monolith, or at least two supporting bodies positioned contiguously, which are each preferably coated with a two-layered, three-way catalyst which is constructed as described further above.

In an advantageous embodiment of the present invention, the catalyst system has a particular three-way catalyst (uf-TWC) located on the downstream side of the SCR catalyst. This three-way catalyst is characterized by the fact that it has two different catalytic coatings on top of each other, wherein it is preferable for the base layer (layer directly on the supporting body) not to have oxygen-storing material. It is also preferred for the base layer to have only palladium as the catalytically active metal, which is advantageously deposited on aluminum oxide with a large surface area and stabilized with barium oxide (see EP1181970A1). Both palladium and rhodium can advantageously be present in the top layer (layer facing the exhaust gas) of the uf-TWC. The metals within the catalytic top layer exist as deposits on aluminum oxide with a large surface that has possibly been stabilized by lanthanum oxide, praseodymium oxide, barium oxide, or yttrium oxide, and on cerium oxide, cerium-zirconium oxide with a large surface, or on cerium-zirconium oxide with a large surface that has been doped by rare earth oxides, such as lanthanum oxide, praseodymium oxide, neodymium oxide, or yttrium oxide (EP1974809B1; U.S. Pat. No. 8,394,348 B1).

As already mentioned, a three-way catalyst usually contains metals from the group of platinum, palladium, rhodium, and mixtures of these metals deposited on large-surface metal oxides potentially stabilized by doping. Preferably, however, only the metals palladium and rhodium occur in the three-way catalysts (cc- and uf-TWC) used according to the invention. The composition of the particularly preferred catalytically active coatings is advantageously as follows:

However, along with the—in the proper sense of the word—'catalytically active' component, it can also contain other materials, such as binders from transition metal oxides, and large-surface carrier oxides, such as titanium oxide, aluminum oxide—especially gamma-$Al_2O_3$—zirconium oxide, or cerium oxide.

The actual catalytically active material used according to the invention is preferably selected from the group of transition-metal-exchanged zeolites or zeolite-like materials. These types of compounds are sufficiently known to the person skilled in the art. In this regard, the materials are preferably selected from the group comprising chabazite, SAPO-34, ALPO-34, zeolite β, and ZSM-5. It is particularly preferable for zeolites or zeolite-like materials of the chabazite type —in particular, CHA or SAPO-34—to be used. In order to ensure sufficient activity, these materials are preferably provided with transition metals from the group consisting of iron, copper, manganese, and silver. It should be mentioned that copper is especially advantageous in this respect. The person skilled in the art knows how one has to furnish the zeolites or zeolite-like materials with the transition metals (EP324082A1; WO2013092707A1, PCT/EP2012/061382, and the literature cited there), to be able to provide good activity with respect to the reduction of nitrogen oxides with ammonia. Furthermore, vanadium compounds, cerium oxides, cerium/zirconium mixed oxides, titanium oxide and tungsten-containing compounds, and mixtures thereof can also be used as catalytically active material.

Materials, which in addition have proven themselves to be advantageous for the application of storing $NH_3$, are known to the person skilled in the art (US2006/0010857AA; WO2004076829A1). In particular, microporous solid materials, such as so-called molecular sieves, are used as storage materials. Such compounds, selected from the group comprising zeolites, such as mordenite (MOR), Y-zeolites (FAU), ZSM-5 (MFI), ferrierite (FER), chabazite (CHA),

| cc-TWC: Base layer (OSM = oxygen-storing material) | | | |
|---|---|---|---|
| Pd | 0.35-11.0 g/L | preferably 0.70-7.06 g/L | particularly preferably 1.00-5.30 g/L |
| $Al_2O_3$ | 20-120 g/L | preferably 30-100 g/L | particularly preferably 40-90 g/L |
| OSM | 20-120 g/L | preferably 30-100 g/L | particularly preferably 40-90 g/L |
| Top layer (OSM = oxygen-storing material) | | | |
| Pd | 0.05-8.83 g/L | preferably 0.1-7.06 g/L | particularly preferably 0.15-5.30 g/L |
| Rh | 0.04-0.71 g/L | preferably 0.07-0.50 g/L | particularly preferably 0.11-0.37 g/L |
| $Al_2O_3$ | 20-120 g/L | preferably 30-100 g/L | particularly preferably 40-90 g/L |
| OSM | 20-120 g/L | preferably 30-100 g/L | particularly preferably 40-90 g/L |
| uf-TWC: Base layer: | | | |
| Pd | 0.35-11.0 g/L | preferably 0.70-7.06 g/L | particularly preferably 1.00-5.30 g/L |
| $Al_2O_3$ | 20-160 g/L | preferably 50-150 g/L | particularly preferably 70-140 g/L |
| Top layer (OSM = oxygen-storing material) | | | |
| Pd | 0.05-8.83 g/L | preferably 0.1-7.06 g/L | particularly preferably 0.15-5.30 g/L |
| Rh | 0.04-0.71 g/L | preferably 0.07-0.50 g/L | particularly preferably 0.11-0.37 g/L |
| $Al_2O_3$ | 20-120 g/L | preferably 30-100 g/L | particularly preferably 40-90 g/L |
| OSM | 20-120 g/L | preferably 30-100 g/L | particularly preferably 40-90 g/L |

The $NH_3$-storing SCR catalyst located in the underfloor (uf) can be designed in accordance with the types known to the person skilled in the art. As a rule, this is a supporting body provided with a catalytically active material for the SCR reaction, or a supporting body which was extruded from a catalytically active material. In the first case, catalytically active material is commonly understood to be the "washcoat," with which the supporting body is provided.

and β-zeolites (BEA), as well as zeolite-like materials, such as aluminum phosphate (AlPO) and silicon aluminum phosphate SAPO or mixtures thereof, can be used (EP0324082 A1). Particularly preferably used are ZSM-5 (MFI), chabazite (CHA), ferrierite (FER), ALPO- or SAPO-34, and β-zeolites (BEA). Especially preferably used are CHA, BEA, and AlPO-34 or SAPO-34. Extremely preferably used are materials of the CHA type, and here, maximally preferably, CHA and SAPO-34. Insofar as a zeolite or a zeolite-like compound as just mentioned above is used as catalytically active material in the SCR catalyst, the addition of further $NH_3$-storing materials can naturally be dispensed with advantageously. Overall, the storage capacity of the ammonia-storing components used can, in a fresh state at a measuring temperature of 200° C., amount to more than 0.9 g $NH_3$ per liter of catalyst volume, preferably between 0.9 and 2.5 g $NH_3$ per liter of catalyst volume, and particularly preferably between 1.2 and 2.0 g $NH_3$/liter of catalyst volume, and most particularly preferably between 1.5 and 1.8 g $NH_3$/liter of catalyst volume. The ammonia-storing capacity can be determined using synthesis gas equipment. To this end, the catalyst is first conditioned at 600° C. with NO-containing synthesis gas to fully remove ammonia residues in the drilling core. After the gas has been cooled to 200° C., ammonia is dosed into the synthesis gas at a space velocity of, for example, 30,000 $h^{-1}$ until the ammonia storage in the drilling core is completely filled, and the ammonia concentration measured downstream of the drilling core corresponds to the starting concentration. The ammonia-storing capacity results from the difference of the amount of ammonia dosed overall and the amount of ammonia measured on the downstream side in relation to the catalyst volume. The synthesis gas is typically composed of 450 ppm $NH_3$, 5% oxygen, 5% water, and nitrogen. In a further preferred embodiment, the SCR catalyst does not have any capacity for storing oxygen. In this case, the uf-SCR catalyst does not have any material with the capacity for storing oxygen.

As indicated at the beginning, harmful secondary emissions, in particular $N_2O$, occur increasingly over a uf-TWC located in the underfloor, if said TWC is in a temperature window ranging between 250-350° C. With the new system arrangement, the danger of nitrous oxide forming over the three-way catalyst located in the underfloor is drastically reduced (FIGS. 2 and 4), which is why the temperature range previously outlined no longer represents a substantial source of secondary emissions. It is clear to the person skilled in the art that the catalysts located in the underfloor should naturally work as often as possible in their optimum temperature window, in order to be able to contribute to as large a reduction in the harmful components in the exhaust gas as possible. Consequently, these catalysts (uf-SCR and uf-TWC) should be operated in a temperature range of 200° C. to 800° C. Preferably, this range should be tared to 250° C. to 600° C. However, in an ideal case, the catalyst pair (uf-SCR and uf-TWC) works in a temperature window of 250-450° C. The person skilled in the art knows how one can influence the temperature of the exhaust gas and the catalysts in the underfloor of a vehicle so that this kind of temperature range can be achieved as easily and as cost-effectively as possible. A relatively simple measure is, for example, to maintain a specific distance from the cc-TWC positioned close to the engine. A preferred embodiment therefore assumes that the distance between the three-way catalyst close to the engine and the uf-SCR catalyst is selected so that a temperature of 250° C. to 450° C. is striven for on the uf-SCR catalyst during driving operation. Within the framework of the invention, close to the engine means a distance between the engine outlet and the catalytic converter inlet of less than 80 cm, preferably less than 60 cm, and most preferably less than 50 cm. For the person skilled in the art, the underfloor position describes a position underneath the cab at a distance of 30-200 cm, preferably 40-150 cm, and most preferably 50-120 cm from the outlet of the supporting body that is close to the engine.

The present invention is also aimed at a method for reducing harmful exhaust gases from vehicles with gasoline combustion engines operated predominantly, on average, stoichiometrically, wherein the exhaust gas is guided over a system as described above during driving operation. It goes without saying that the advantageous embodiments described for the system are also applicable within the framework of the claimed method.

Fundamentally, the exhaust gas catalysts mentioned here consist of one or several adjacent supporting bodies on which or into which—e.g., into the porous wall structures—the catalytically active coating is applied. It is clear to the person skilled in the art what the possible supports could be in this case. What is meant are so-called flow-through monoliths or particulate filters (Christian Hagelüken, "Autoabgaskatalysatoren" ["Exhaust Gas Catalysts for Vehicles"], 2005, 2nd edition, pp. 27-46). Such units (filters, as well as flow-through monoliths) are well known to the person skilled in the art - likewise when coated with an SCR- or TWC-active coating (e.g., for the filters DE102010055147A1; US20100293929; US20110252773; US20110158871; DE102012105822A1; EP1961933A1; DE102012015840A1, WO13014467A1, US2010287915AA, EP2117681A; EP2117707A).

Common filter bodies known in the prior art can be made of metal and/or ceramic materials. These include, for example, metallic fabric and knitted filter bodies, sintered metal bodies and foam structures from ceramic materials. Preferably, porous wall-flow filter substrates of cordierite, silicon carbide, or aluminum titanate are used. These wall-flow filter substrates have inlet and outlet channels, wherein the respective downstream ends of the inlet channels and the upstream ends of the outlet channels are offset against each other and closed with gas-tight "plugs." In this case, the exhaust gas that is to be purified and flows through the filter substrate is forced to pass through the porous wall between the inlet and outlet channels, which induces an excellent particulate filter effect. The filtration property for particulates can be designed by means of porosity, pore/radii distribution, and the thickness of the wall. The catalytically active coating is present in and/or on the porous walls between the inlet and outlet channels. Preferably used TWC filter substrates may be gathered from European patent applications EP2650042A1, EP2042225A1, EP2042226A2. Preferably used SCR filter substrates may be gathered from European patent applications EP2117681A and EP1961933A1.

In the prior art, flow-through monoliths are common catalyst carriers that can consist of metal or ceramic materials. Preferably, fire-proof ceramics, such as cordierite, are used. The monoliths made from ceramics mostly have a honeycomb structure that consists of continuous channels, which is why they are also referred to as channel flow monoliths or flow-through monoliths. The exhaust gas can flow through the channels and, in doing so, comes into contact with the channel walls which are provided with a catalytically active coating. The number of channels per area is characterized by the cell density, which typically ranges between 46.5 and 139.5 cells per square centimeter (between 300 and 900 cells per square inch (cpsi)). The wall thickness of the channel walls in ceramics is between 0.5-0.05 mm.

Particularly preferred supporting bodies are ceramic honeycomb bodies, both flow-through substrates and ceramic filter bodies, e.g., from cordierite, as well as analogous metal supports (see above). In this case, preferably round or oval-shaped supports with a diameter of 63.5-152.1 mm and a length of 76.6-152.4 mm are used. For the realization of the concept according to the invention, one catalyst close to the engine with one or two coating zones or a plurality of catalysts close to the engine in serial arrangement with the respective coatings may be used. The catalysts located close to the engine are preferably mounted in a common housing and abut one another. The catalysts located in the underfloor preferably form an additional pair constructed to abut one another, which is also accommodated in a housing.

The present invention allows the primary emissions of a predominantly, on average, stoichiometrically operated gasoline engine to be effectively reduced. Moreover, however, using the present system, it is also possible to reduce the secondary emissions ($NH_3$ and $N_2O$) to such an extent that current and future legislation which takes these emissions into account can be reliably complied with. Against the backdrop of the known prior art, this was not obviously to be expected by the person skilled in the art.

EXAMPLES

Example 1

Figure 1:
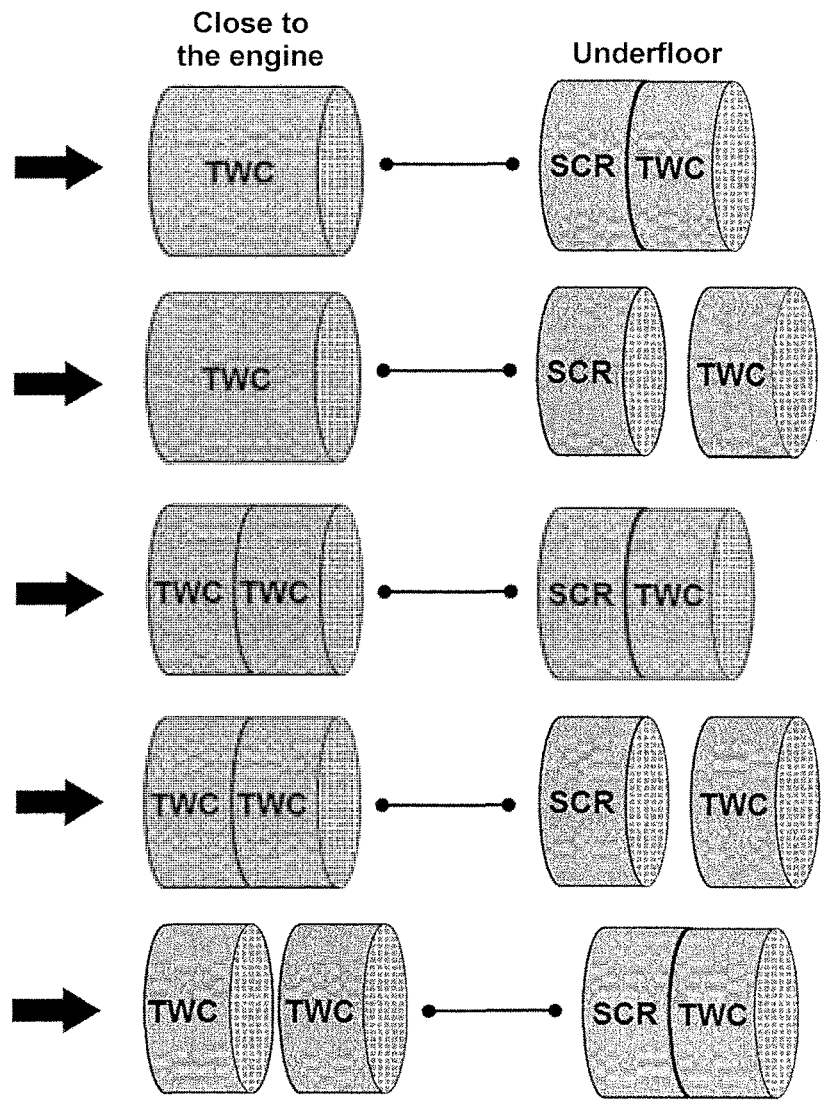
FIG. 1: Conceivable catalyst systems for a reduction according to the invention of the gaseous pollutants hydrocarbons THC, carbon monoxide CO, nitrogen oxide NOx, and the secondary emissions nitrous oxide $N_2O$ and ammonia $NH_3$ in combustion engines operated with gasoline.
Figure 2:
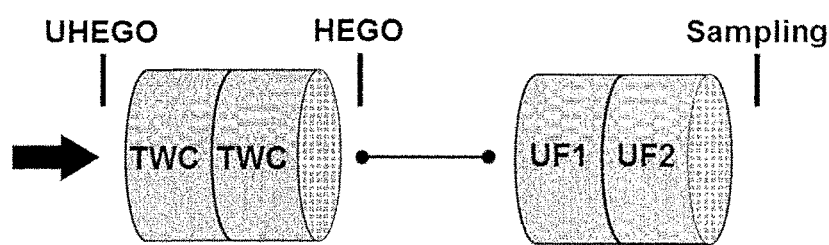
FIG. 2: Test design used for the engine test bench and vehicle tests.
Figure 3:
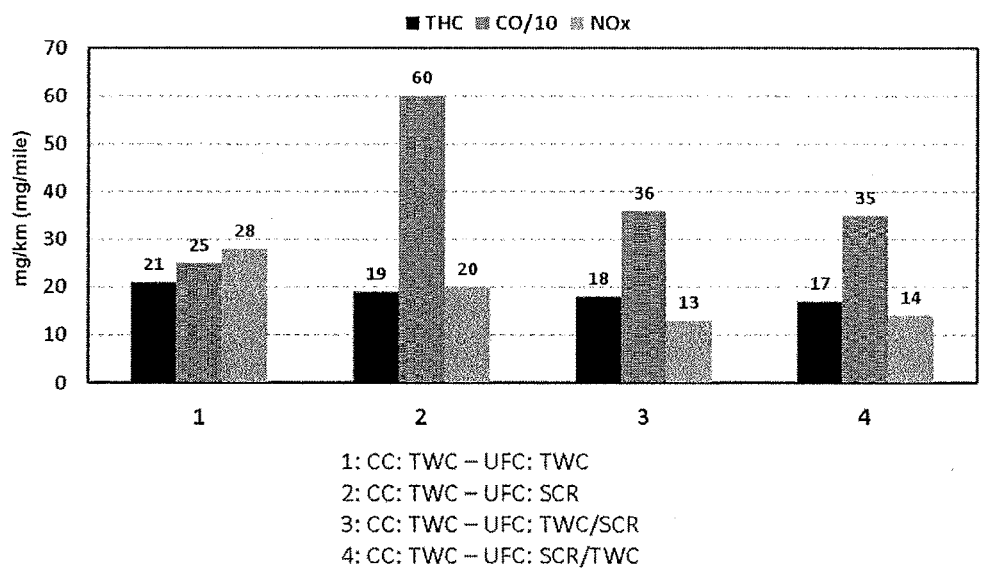
FIG. 3: Shows the gaseous pollutants hydrocarbons THC (black), carbon monoxide CO (dark gray), and nitrogen oxides NOx (light gray) emitted during FTP-75 tests on the engine test bench in mg/km (mg/mile) for the systems 1-4 investigated.
Figure 4:
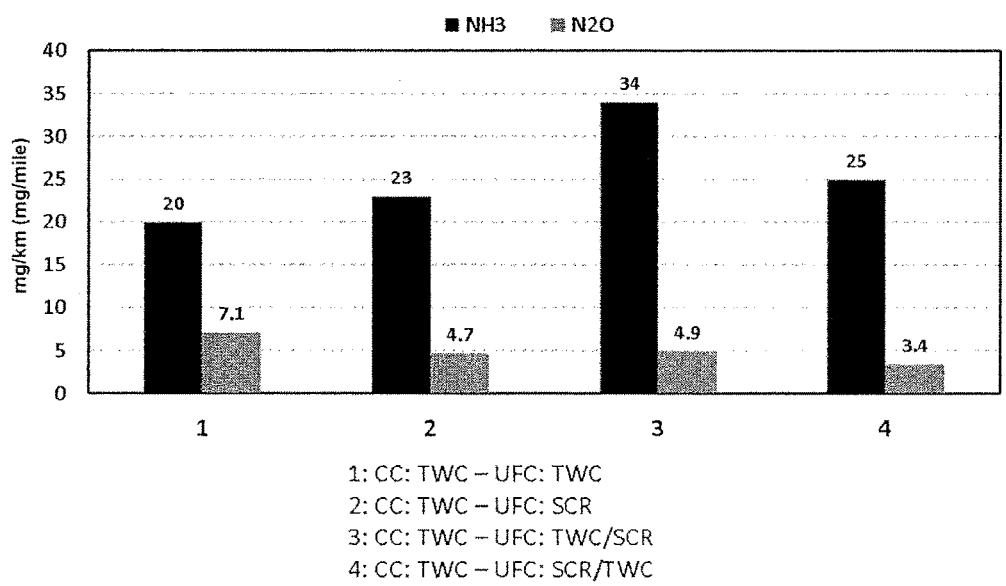
FIG. 4: Shows the secondary emissions ammonia $NH_3$ (black) and nitrous oxide $N_2O$ (gray) emitted during FTP-75 tests on the engine test bench in mg/km (mg/mile) for the systems 1-4 investigated.

The ceramic substrates were coated with the different washcoats of the catalysts shown in FIG. 2 according to the current prior art. The catalysts close to the engine were then aged in a ZDAKW aging process on the engine test bench in order to simulate a mileage of 160,000 km in the vehicle. The aging is characterized by regular phases of overrun fuel cutoff, which then, with temporarily lean exhaust gas composition, results in a bed temperature of over 1000° C. These conditions result in an irreversible damage to the oxygen-storing material and the noble metals. The underfloor catalysts were aged due to the low exhaust gas temperature with a bed temperature of 800° C. These catalysts were subsequently tested on a highly dynamic engine test bench, on a current 2.0 L four-cylinder application, in the dynamic FTP-75 driving cycle (FIG. 2). In so doing, the distance of the catalysts close to the engine from the underfloor catalysts was selected so that the bed temperature of the underfloor converters did not exceed 400° C. The pollutant concentrations of THC, CO, and NOx were measured by means of continuous modal analysis. Nitrous oxide and ammonia were determined by means of FTIR measurement. After completion of the test, the modal concentrations were cumulated, and the resulting pollutant masses were weighted according to current U.S. law. The results are shown in FIGS. 3-4. Systems 3 and 4 show considerable advantages in nitrogen oxide emissions compared to system 1. However, system 4 is distinguished from system 3 by its significantly lower ammonia and nitrous oxide emissions.

Example 2

Figure 5:
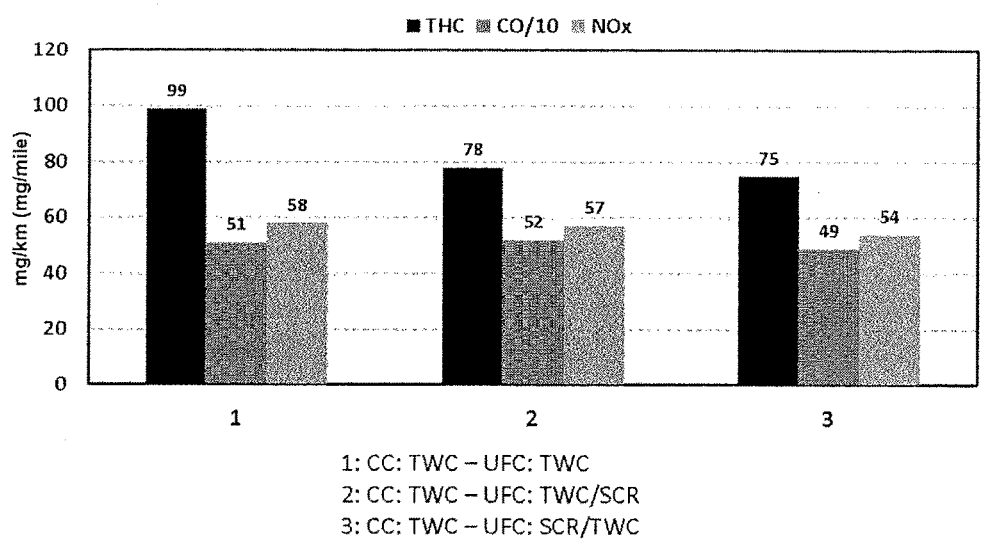
FIG. 5: Shows the gaseous pollutants hydrocarbons THC (black), carbon monoxide CO (dark gray), and nitrogen oxides NOx (light gray) emitted during FTP-75 tests on a 1.4 L vehicle in mg/km (mg/mile) for the systems 1-3 investigated.
Figure 6:
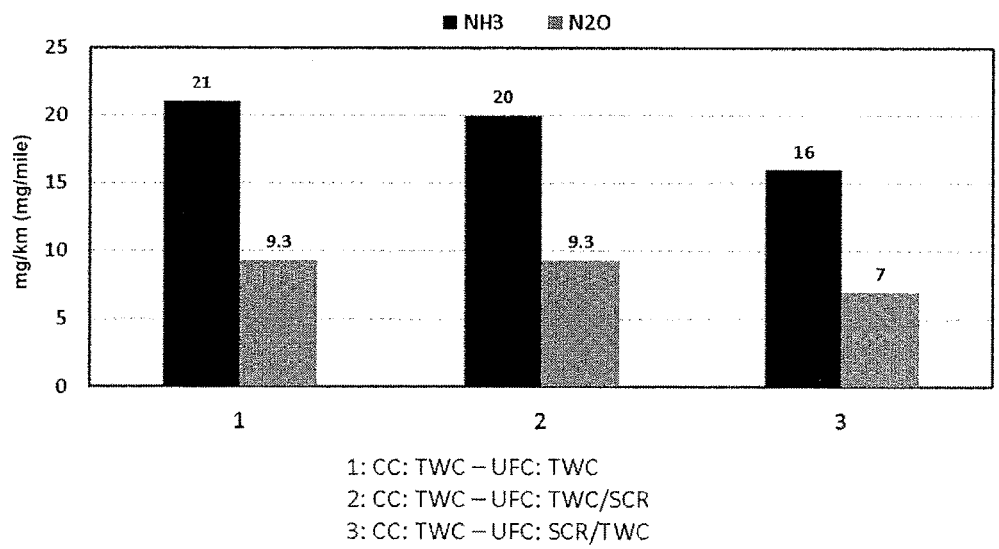
FIG. 6: Shows the secondary emissions ammonia $NH_3$ (black) and nitrous oxide $N_2O$ (gray) emitted during FTP-75 tests on a 1.4 L vehicle in mg/km (mg/mile) for the systems 1-3 investigated.

The ceramic substrates were coated with the different washcoats of the catalysts shown in FIG. 2 according to the current prior art. The catalysts close to the engine were then aged in a ZDAKW aging process on an engine test bench in order to simulate a mileage of 160,000 km in the vehicle. The aging is characterized by regular phases of overrun fuel cutoff, which then, with temporarily lean exhaust gas composition, results in a bed temperature of over 1000° C. These conditions result in an irreversible damage to the oxygen-storing material and the noble metals. The underfloor catalysts were aged due to the low exhaust gas temperature with a bed temperature of 800° C. These catalysts were subsequently tested on a current 1.4 L four-cylinder turbo application with direct gasoline injection in the dynamic FTP-75 driving cycle (FIG. 2). The distance of the catalysts close to the engine from the underfloor catalysts was approx. 110 cm, as in the series configuration. The exhaust gas of the respective phases of the FTP-75 was collected in a CVS system in three different bags. After completion of the test, the bags were analyzed and weighted according to current U.S. law. Nitrous oxide and ammonia were determined by means of continuous FTIR measurement. After completion of the test, the concentrations were cumulated, and the resulting pollutant masses were weighted analogously to the bag results according to current U.S. law. The results are shown in FIGS. 5-6. Compared to systems 1 and 2, system 3 shows advantages in the pollutants THC, CO, and NOx. Moreover, compared to the other systems 1 and 2, system 3 is distinguished by significantly lower ammonia and nitrous oxide emissions.

Example 3

Figure 7:
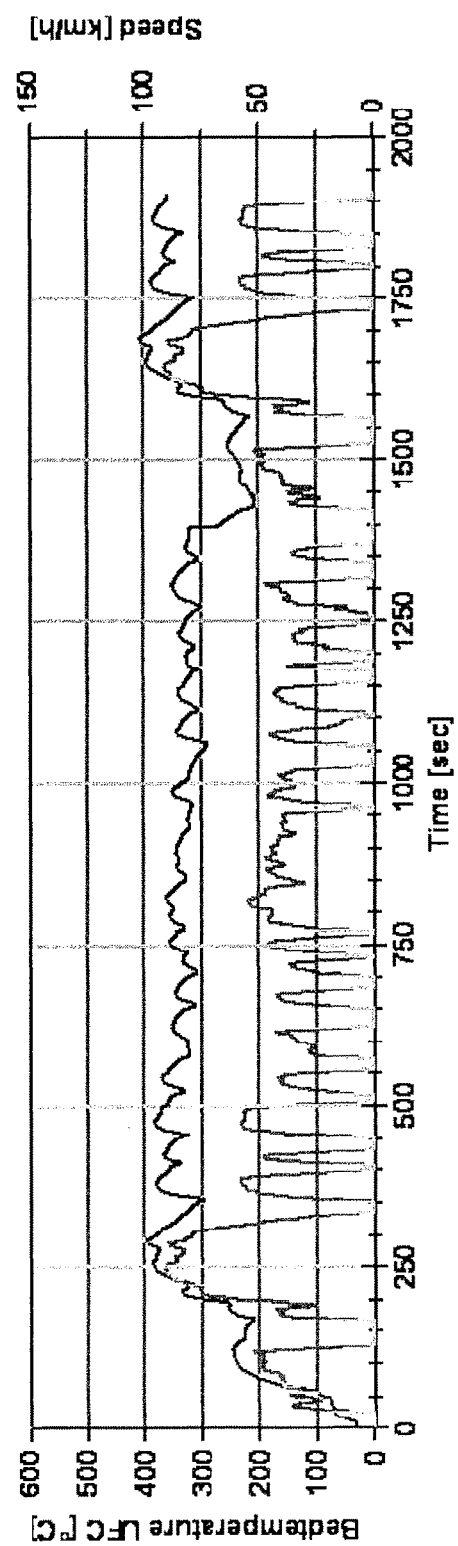
FIG. 7: Shows the temperature inside the underfloor catalyst UFC during an FTP-75 test on the engine test bench, measured 2.54 centimeters (1 inch) downstream of the inlet of the ceramic monolith.
Figure 8:
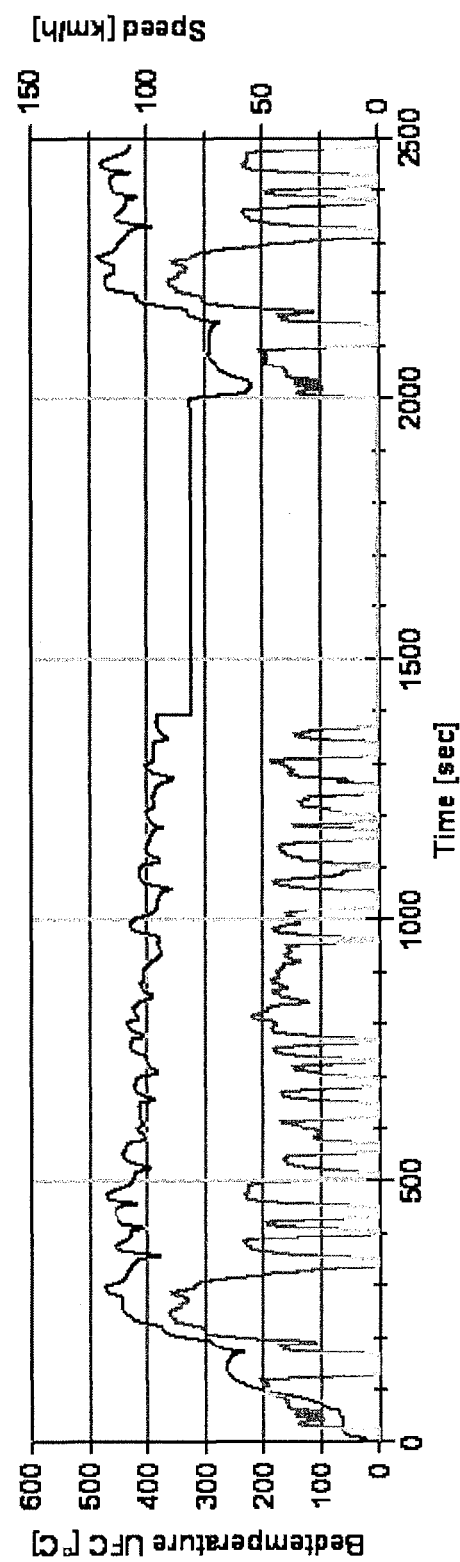
FIG. 8: Shows the temperature inside the underfloor catalyst UFC during an FTP-75 test on a 1.4 L vehicle, measured 2.54 centimeters (1 inch) downstream of the inlet of the ceramic monolith.

The ceramic substrates were coated with the different washcoats of the catalysts shown in FIG. 2 according to the current prior art. The catalysts close to the engine were then aged in a ZDAKW aging process on the engine test bench in order to simulate a mileage of 160,000 km in the vehicle. The aging is characterized by regular phases of overrun fuel cutoff, which then, with temporarily lean exhaust gas composition, results in a bed temperature of over 1000° C. These conditions result in an irreversible damage to the oxygen-storing material and the noble metals. The underfloor catalysts were aged due to the low exhaust gas temperature with a bed temperature of 800° C. Three different three-way catalysts arranged downstream of the SCR catalyst were investigated. The two entries 1 and 2 contain three-way catalysts arranged downstream of the SCR catalyst which have the same or more oxygen-storing capacity, calculated in mg per liter of catalyst volume, than the three-way catalyst close to the engine. However, in entry 3 according to the invention, the three-way catalyst arranged downstream of the SCR catalyst has a smaller oxygen-storing capacity than the three-way catalyst close to the engine. These catalysts were subsequently tested on a highly dynamic engine test bench, on a current 2.0 L four-cylinder application, in the dynamic FTP-75 driving cycle (FIG. 2). The distance of the catalysts close to the engine from the underfloor catalysts was selected so that the bed temperature of the underfloor converter did not exceed 400° C. (FIG. 7). The pollutant concentrations of THC, CO, and NOx were measured by means of continuous modal analysis.

Figure 9:
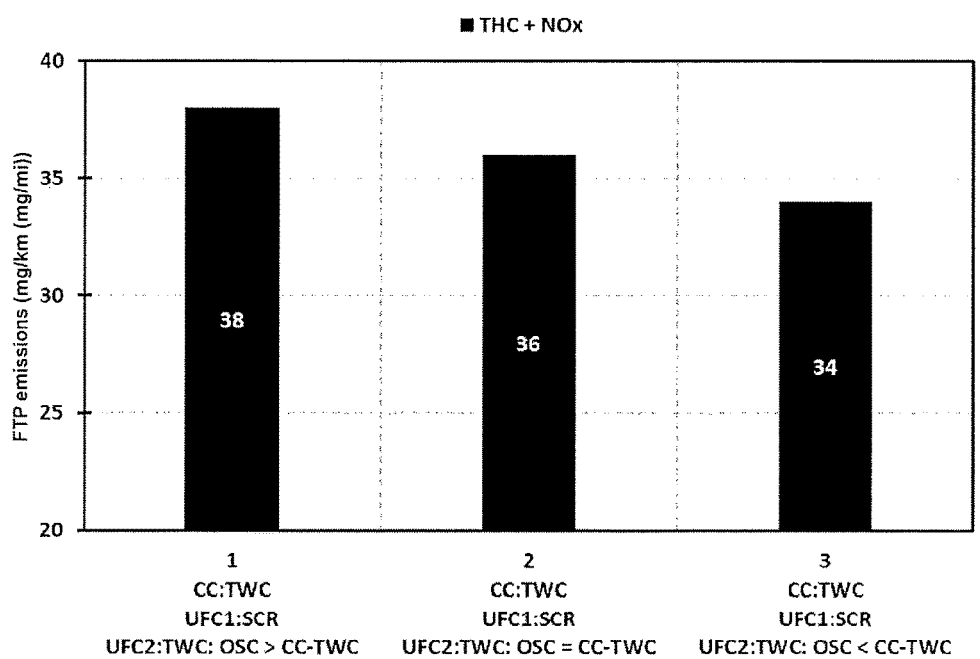
FIG. 9: Shows the cumulated emissions of a system according to the invention in comparison with 2 catalyst arrangements which are not according to the invention.

After completion of the test, the modal concentrations were cumulated, and the resulting pollutant masses were weighted according to current U.S. law. The results are shown in FIG. 9. The system 3 according to the invention shows lower emissions compared to systems 1 and 2.

The invention claimed is:

1. A catalyst system for reducing harmful exhaust gases from a vehicle having a gasoline combustion engine that is operated predominantly, on average, stoichiometrically, having, in the following sequence:
   i) a three-way catalyst arranged close to the engine,
   ii) an SCR catalyst arranged in the underfloor of the vehicle, the SCR catalyst having an $NH_3$-storing capacity, and
   iii) an additional three-way catalyst arranged downstream of the SCR catalyst,
   wherein the additional three-way catalyst arranged downstream of the SCR catalyst has less oxygen-storing capacity in mg per liter of catalyst volume than an oxygen-storing capacity of the three-way catalyst close to the engine.

2. The catalyst system according to claim 1, wherein the three-way catalyst arranged downstream of the SCR catalyst comprises two different catalytic coatings lying one on top of the other.

3. The catalyst system according to claim 2, wherein a base catalytic coating of the three-way catalyst arranged downstream of the SCR catalyst has no oxygen-storing material.

4. The catalyst system according to claim 3, wherein the base catalytic coating has only palladium as a catalytically active metal.

5. The catalyst system according to claim 4, wherein a top catalytic coating of the three-way catalyst arranged downstream of the SCR catalyst has palladium and rhodium as the only catalytically active metals, and oxygen-storing material.

6. The catalyst system according to claim 1, wherein the SCR catalyst has no oxygen-storing material.

7. The catalyst system according to claim 1, wherein the SCR catalyst is positioned downstream of the three-way catalyst close to the engine by such a distance that, during a driving operation, a temperature of the SCR catalyst is 300° C. to 400° C.

8. A process for reducing harmful exhaust gases from a vehicle having a gasoline combustion engine that is operated predominantly, on average, stoichiometrically, comprising passing the exhaust gas over a catalyst system according to claim 1 during a driving operation.

9. The catalyst system according to claim 1, wherein the oxygen-storing capacity of the three-way catalyst close to the engine makes up >50% of the oxygen-storing capacity of the catalyst system.

10. The catalyst system according to claim 1, wherein the oxygen-storing capacity of the three-way catalyst close to the engine makes up ≥60% of the oxygen-storing capacity of the catalyst system.

11. The catalyst system according to claim 1, wherein the oxygen-storing capacity of the three-way catalyst close to the engine makes up ≥70% of the oxygen-storing capacity of the catalyst system.

12. The catalyst system according to claim 1, wherein a ratio of the oxygen-storing capacity of the three-way catalyst arranged downstream of the SCR catalyst to the oxygen-storing capacity of the three-way catalyst arranged close to the engine is from 1:2 to 1:12.

13. The catalyst system according to claim 1, wherein a ratio of the oxygen-storing capacity of the three-way catalyst arranged downstream of the SCR catalyst to the oxygen-storing capacity of the three-way catalyst arranged close to the engine is from 1:2 to 1:7.

14. The catalyst system according to claim 1, wherein a ratio of the oxygen-storing capacity of the three-way catalyst arranged downstream of the SCR catalyst to the oxygen-storing capacity of the three-way catalyst arranged close to the engine is from 1:7 to 1:12.

\* \* \* \* \*